United States Patent
Choi

(10) Patent No.: US 10,832,138 B2
(45) Date of Patent: Nov. 10, 2020

(54) METHOD AND APPARATUS FOR EXTENDING NEURAL NETWORK

(71) Applicant: Samsung Electronics Co., Ltd., Suwon-si (KR)

(72) Inventor: Heeyoul Choi, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1111 days.

(21) Appl. No.: 14/704,785

(22) Filed: May 5, 2015

(65) Prior Publication Data

US 2016/0155049 A1    Jun. 2, 2016

(30) Foreign Application Priority Data

Nov. 27, 2014 (KR) .................. 10-2014-0167510

(51) Int. Cl.
*G06N 3/08* (2006.01)

(52) U.S. Cl.
CPC ............ *G06N 3/084* (2013.01); *G06N 3/082* (2013.01)

(58) Field of Classification Search
None
See application file for complete search history.

(56) References Cited

U.S. PATENT DOCUMENTS

| | | | |
|---|---|---|---|
| 5,033,006 A | 7/1991 | Ishizuka et al. | |
| 5,621,862 A | 4/1997 | Nakahira et al. | |
| 7,395,251 B2 | 7/2008 | Linsker | |
| 7,469,209 B2 | 12/2008 | Chong-White et al. | |
| 8,412,525 B2 | 4/2013 | Mukerjee et al. | |
| 8,443,169 B2 | 5/2013 | Pechanek | |
| 8,521,542 B1 | 8/2013 | Stotts | |
| 9,839,364 B2 * | 12/2017 | Moorman | A61B 5/02405 |
| 2005/0010116 A1 * | 1/2005 | Korhonen | A61B 5/1106 600/481 |
| 2007/0233802 A1 | 10/2007 | Kulkarni | |
| 2008/0065575 A1 * | 3/2008 | Szathmary | G06N 3/086 706/27 |
| 2008/0281767 A1 * | 11/2008 | Garner | G06N 3/088 706/25 |
| 2012/0017149 A1 | 1/2012 | Lai et al. | |

(Continued)

FOREIGN PATENT DOCUMENTS

| | | |
|---|---|---|
| JP | H02-238560 A | 9/1990 |
| JP | H08-022446 A | 1/1996 |
| KR | 10-0277694 B1 | 1/2001 |

(Continued)

OTHER PUBLICATIONS

Dokur et al, Segmentation of ultrasound images by using a hybrid neural network, 2002.*

(Continued)

*Primary Examiner* — Li B. Zhen
*Assistant Examiner* — Mikayla Chubb
(74) *Attorney, Agent, or Firm* — NSIP Law

(57) ABSTRACT

Methods and apparatus for extending a neural network, reducing its dimension and processing input data are provided. The method of extending a neural network involves selecting, with a processor, a node of a neural network, adding a new node in a layer that includes the selected node, and setting connection weights of the new node based on connection weights of the selected node.

24 Claims, 22 Drawing Sheets

(56) References Cited

U.S. PATENT DOCUMENTS

2013/0138436 A1    5/2013    Yu et al.
2017/0017212 A1*    1/2017    Collins .................. G06N 3/084

FOREIGN PATENT DOCUMENTS

| KR | 10-0306140 B1 | 11/2001 |
| --- | --- | --- |
| KR | 10-0307202 B1 | 12/2001 |
| KR | 10-2006-0044629 A | 5/2006 |
| KR | 10-2009-0050809 A | 5/2009 |

OTHER PUBLICATIONS

Zhang et al, A Merging and Splitting Algorithm Based on Mutual Information for Design Neural Networks, 2010.*

Liu et al, A Population-Based Learning Algorithm Which Learns Both Architectures and Weights of Neural Networks (Year: 1996).*

Yao et al, A New Evolutionary System for Evolving Artificial Neural Networks (Year: 1997).*

Ying et al, Evolutionary Design of Neural Network Classifiers for Radar Target Recognition (Year: 2001).*

Andreakis et al, Incremental Unsupervised Time Series Analysis Using Merge Growing Neural Gas (Year: 2007).*

Han et al, Model predictive control of dissolved oxygen concentration based on a self-organizing RBF neural network (Year: 2012).*

Backory, Jay K., et al. "A Robust Growing-Pruning Algorithm Using Fuzzy Logic." Neural Networks, 1995. Proceedings., IEEE International Conference on. vol. 4. IEEE, 1995. (6 pages in English).

Esaki, Tomohito, et al. "Extracting Human Players' Shogi Game Strategies From Game Records Using Growing SOM." Neural Networks, 2008. IJCNN 2008. (IEEE World Congress on Computational Intelligence). IEEE International Joint Conference on. IEEE, 2008. (6 pages in English).

European Search Report dated Feb. 8, 2017 in corresponding European Patent Application No. 15191364.7 (13 pages in English).

Islam, Md Monirul, et al. "A New Adaptive Merging and Growing Algorithm for Designing Artificial Neural Networks." IEEE Transactions on Systems, Man, and Cybernetics, Part B (Cybernetics) 39.3 (2009): (18 pages in English).

Weng, Wei, et al.. "An Adaptive Structure Neural Networks With Application to EEG Automatic Seizure Detection." Neural Networks 9.7 (1996): (18 pages in English).

Hinton, Geoffrey E., et al. "Reducing the dimensionality of data with neural networks." Science 313.5786 (2006): 504-507.

European Office Action dated Apr. 12, 2019 in corresponding European Patent Application No. 15191364.7 (11 pages in English).

Japanese Office Action dated Jun. 4, 2019 in corresponding Japanese Application No. 2015-168612 (8 pages in English, 6 pages in Japanese).

Masahiro et al., "Self-Organizing Feature Extraction Using Associative Memory," Journal of IEE Japan, Oct. 1, 2000, vol. 120-C, No. 10, pp. 1467-1474.

* cited by examiner

FIG. 4A

| HIDDEN LAYER | ACTIVATION PATTERN | ACTIVATION FREQUENCY |
|---|---|---|
| 121 — FIRST HIDDEN NODE | OFF  ON  OFF  OFF  OFF | 1 |
| 122 — SECOND HIDDEN NODE | ON  ON  OFF  ON  OFF | 3 |

FIG. 4B

| HIDDEN LAYER | ACTIVATION PATTERN | ACTIVATION FREQUENCY | ACTIVATION ENTROPY |
|---|---|---|---|
| FIRST HIDDEN NODE | ON OFF ON OFF ON | 3 | 4 |
| SECOND HIDDEN NODE | ON ON ON OFF OFF | 3 | 1 |

121 — FIRST HIDDEN NODE
122 — SECOND HIDDEN NODE

900

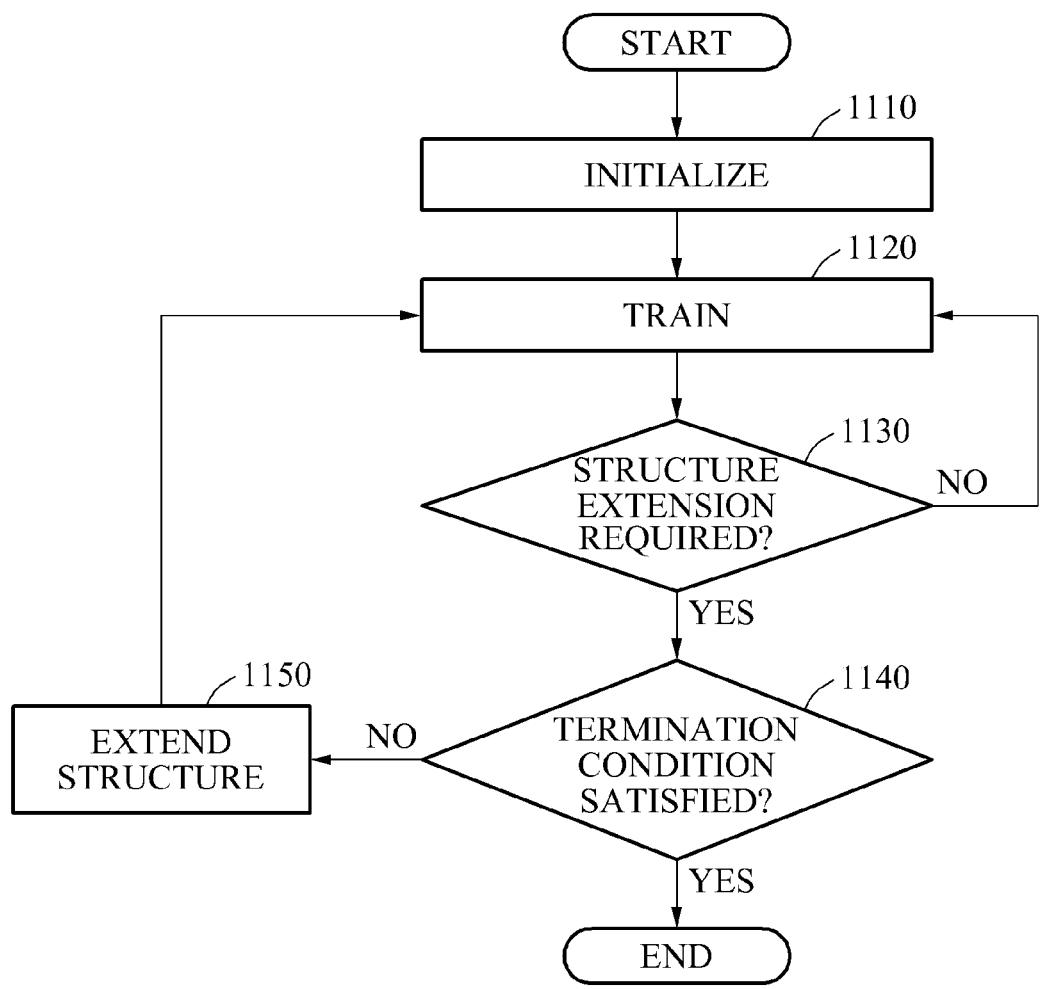

1300

1320

1210

1230

1500

METHOD AND APPARATUS FOR EXTENDING NEURAL NETWORK

CROSS-REFERENCE TO RELATED APPLICATION

This application claims the benefit under 35 USC 119(a) of Korean Patent Application No. 10-2014-0167510, filed on Nov. 27, 2014, in the Korean Intellectual Property Office, the entire disclosure of which is incorporated herein by reference for all purposes.

BACKGROUND

1. Field

The following description relates to an artificial neural network learning technique, and to a method and apparatus for extending a neural network and adjusting its dimension.

2. Description of Related Art

Pattern recognition can be applied to various technologies, including the recognition of handwritten characters, medical diagnosis using imaging technologies, and detecting faults in machinery design. Human brain is capable of effortlessly recognizing patterns in visual images. However, performing efficient and accurate pattern recognition with a computer has been immensely difficult.

To classify an input pattern as a member that belongs to a predetermined group, computer scientists are actively conducting researches on the method of applying the efficient and accurate pattern recognition performed by people to an actual computer. One of such research is about an artificial neural network that models characteristics of biological nerve cells of a human brain, with the use of mathematical expressions. To classify an input pattern as a member of a predetermined group, the artificial neural network employs an algorithm that simulates a learning capability of a human brain. Through this algorithm, the artificial neural network may generate mapping between the input pattern and output patterns. A capability of generating such mapping may be referred to as a learning capability of the artificial neural network. Further, the artificial neural network may have a generalization capability of generating a relatively accurate output with respect to an input pattern yet to be used for learning, based on a result of learning.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of extending a neural network involves selecting, with a processor, a node of a neural network, adding a new node in a layer that includes the selected node, and setting connection weights of the new node.

The general aspect of the method may further include determining whether an extension of the neural network is required.

The determining may involve monitoring a performance of the neural network, and determining that the extension of the neural network is required in response to a level of performance improvement of the neural network being less than a predetermined first threshold value.

The determining involves monitoring a performance of the neural network, and terminating training of the neural network in response to a level of performance improvement of the neural network being less than a predetermined first threshold value, and a level of performance improvement of the neural network after a previous extension of the neural network is performed being less than a predetermined second threshold value.

The selecting may involve selecting at least one node of the neural network based on at least one of activation frequency information and activation entropy information of nodes in the neural network.

The activation frequency information may include an activation frequency of each nodes in the neural network within a predetermined time period.

The activation entropy information may include a count of transitions of each nodes in the neural network between an active state and an inactive state within a predetermined time period.

A node having a highest activation frequency within a predetermined time period may be selected among the nodes in the neural network.

A node having an activation entropy less than a predetermined third threshold value and an activation frequency greater than a predetermined fourth threshold value within a predetermined time period may be selected among the nodes in the neural network.

The adding may involve connecting the new node to nodes included in a layer preceding the layer, and connecting the new node to nodes included in a layer subsequent to the layer.

The setting may involve setting the connection weights of the new node to a predetermined initial value.

The connection weights of the selected node may be weights corresponding to edges connected to the selected node, and the connection weights of the new node are weights corresponding to edges connected to the new node.

The setting may involve selecting at least a portion of connection weights of the selected node, and setting connection weights of at least a portion of the new node to correspond to the selected portion of the connection weights of the selected node.

The setting may further involve setting the selected at least a portion of the connection weights of the selected node to a predetermined initial value.

The selecting of the at least a portion of the connection weights of the selected node may involve dividing the connection weights of the selected node into a first group and a second group, and selecting connection weights belonging to one of the first group and the second group.

The connection weights of the selected node may be divided into the first group and the second group so that a difference between a sum of connection weights belonging to the first group and a sum of connection weights belonging to the second group is less than or equal to a predetermined fifth threshold value.

The setting may involve setting input connection weights of the new node based on input connection weights of the selected node, selecting a portion of output connection weights of the selected node, setting connection weights corresponding to the selected portion of the output connection weights, among the connection weights of the new node, based on the selected portion of the output connection weights, and setting the selected portion of the output connection weights of the selected node to a predetermined initial value.

The general aspect of the method may further involve setting an activation characteristic of the new node based on an activation characteristic of the selected node.

The general aspect of the method may further involve training the neural network extended to include the new node.

An initial structure of the neural network may include a plurality of hidden layers including nodes fewer than or equal to a predetermined number.

The selecting may involve selecting at least one node of the plurality of hidden layers.

In another general aspect, a method of dimension reduction involves training a neural network including an input layer, one or more hidden layer, and an output layer, determining whether an extension of a hidden layer is required during the training of the neural network, and extending the hidden layer in response to a determination that the extension of the hidden layer is required.

The general aspect of the method may further involve initializing the neural network prior to the training of the neural network, the initializing involving generating a plurality of nodes corresponding to the input dimension in the input layer, generating at least one node corresponding to a predetermined initial value in the one or more hidden layer, and generating a plurality of nodes corresponding to the input dimension in the output layer.

The determining may involve monitoring a performance of the neural network based on differences between values input into the input layer and values output from the output layer, and determining that an extension of a structure of the neural network is required in response to a level of performance improvement of the neural network being less than a predetermined threshold value.

The extending involves selecting a node of a hidden layer, adding a new node in the hidden layer including the selected node, and setting connection weights of the new node based on connection weights of the selected node.

The selecting may involve selecting the node based on at least one of activation frequency information and activation entropy information of nodes of the neural network.

The adding may involve connecting the new node to nodes included in a layer preceding the hidden layer including the selected node, and connecting the new node to nodes included in layer preceding the hidden layer including the selected node.

The setting may involve selecting at least a portion of the connection weights of the selected node, and setting a portion of connection weights of the new node to correspond to the selected portion of the connection weights of the selected node.

The setting may further involve setting the selected at least a portion of the connection weights of the selected node to a predetermined initial value.

The general aspect of the method may further involve training the neural network including the extended hidden layer.

In another general aspect, a non-transitory computer-readable storage medium stores instructions to cause a computer to perform the above described methods of extending a neural network.

In yet another general aspect, an apparatus for extending a neural network includes a selector configured to select at least one node of a neural network, a generator configured to add a new node in a layer that includes the selected node, and a setter configured to set connection weights of the new node based on connection weights of the selected node.

In yet another general aspect, an apparatus for dimension reduction may include a trainer configured to train a neural network comprising an input layer, one or more hidden layer and an output layer, a determiner configured to determine whether an extension of a hidden layer is required based on the training of the neural network, and an extender configured to extend a hidden layer in response to a determination that the extension of the hidden layer is required.

The general aspect of the apparatus may further include an initializer configured to initialize the input layer, the one or more hidden layer, and the output layer of the neural network.

In another general aspect, an apparatus for extending a neural network includes a memory configured to store a neural network, and a processor configured to extend the neural network by selecting a node of the neural network based on activation information, and adding a new node to a layer that includes the selected node.

The processor may be configured to set connection weights of the new node based on connection weights of the selected node.

The processor may be configured to adjust the connection weights of the new node by training the extended neural network with training data.

The processor may be configured to apply training data from a training data memory storage to the extended neural network and determine whether an extension of a hidden layer is required based on an activation pattern of the extended neural network, and to increase a number of layers of the neural network based on the determination that the extension of the hidden layer is required.

The general aspect of the apparatus may further include an input device, and the processor may be configured to apply input data obtained with use of the input device to the neural network to obtain an output data.

The layer including the selected node may be a hidden layer of the neural network.

Other features and aspects will be apparent from the following detailed description, the drawings, and the claims.

BRIEF DESCRIPTION OF THE DRAWINGS

FIGS. 4A and 4B illustrate examples of a method of selecting a node based on activation patterns.

FIG. 11A is a flowchart illustrating an example of a method of extending a neural network.

Figure 1:
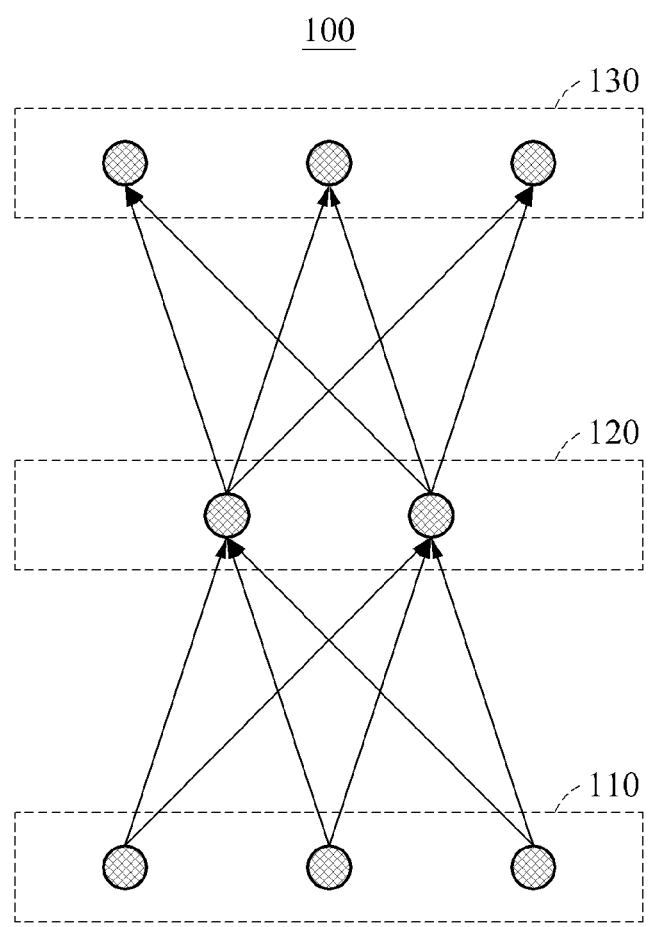
FIG. 1 is a diagram illustrating an example of a neural network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, examples will be described in detail with reference to the accompanying drawings, wherein like reference numerals refer to like elements throughout.

FIG. 1 is a diagram illustrating an example of a neural network. Referring to FIG. 1, a neural network 100 may be a recognition model that simulates a computation capability of a biological system using a large number of artificial neurons connected by edges. The neural network 100 may be implemented as software, hardware, or a combination thereof. The neural network 100 may also be referred to as an artificial neural network.

The neural network 100 may use artificial neurons having simplified functions of biological neurons. The artificial neurons may be referred to as nodes. The artificial neurons may be connected to each other through edges having connection weights. The connection weights may be predetermined values of the edges, and may also be referred to as synapse weights or connection strengths.

Figure 18:
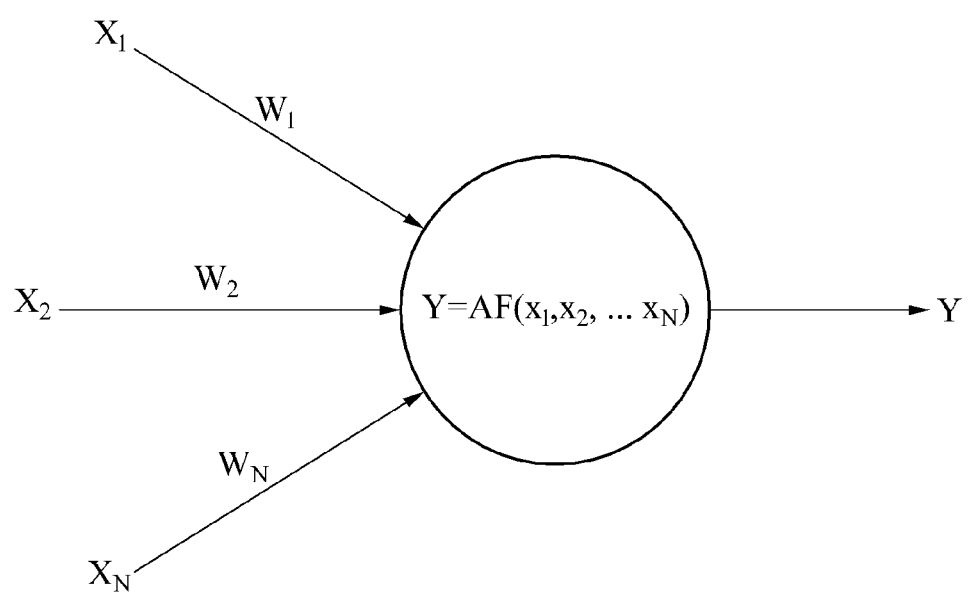
FIG. 18 is a schematic diagram illustrating an example of an artificial neuron.

FIG. 18 illustrates an example of an artificial neuron. In this example, the artificial neuron is implemented with a node as a body of the artificial neuron and with an input vector of the node and an output vector of a previous artificial neuron forming an edge between the node and a previous node. However, various modifications to the data structure of the artificial neuron would be apparent to those skilled in the art, and such modifications are within the scope of the present disclosure.

Referring to FIG. 18, the artificial neuron is capable of accepting inputs $X_1$ to $X_N$ from n input sources. The n input sources may be, for instance, synapses of another artificial neuron, sensors, input data storage or other data sources. The input vectors that connect the body of the artificial neuron to the inputs $X_1$ to $X_N$ may be scaled with individual synaptic weights $W_1$ to $W_N$. The synaptic weights may influence the strength of the inputs received by the body of the neuron. For example, a synaptic weight $W_1$ of 0.8 may be used to reduce the input $X_1$ by 80% when the body of the neuron is reached. The received inputs may be combined by a linear summation, or additional functions may be applied to combine the received inputs based on an activation function $AF(x_1, x_2 \ldots x_N)$. For example, inputs received through certain input vectors may deactivate the artificial neuron, rather than activate the neuron. Based on the activation function $AF(x_1, x_2 \ldots x_N)$, the body of the neuron adjust the combined inputs to generate an output "Y." According to one example, the result of the activation function $AF(x_1, x_2 \ldots x_N)$ must exceed a threshold value for the neuron to fire the output "Y" to the next neuron. In other words, the artificial neuron will not fire a signal for the next artificial neuron and will maintain an inactive state unless a certain threshold strength of activation is received through the input vectors. Various modifications to the structure of the artificial neurons are possible, and such variations are within the scope of the present disclosure.

Referring back to FIG. 1, the neural network 100 may perform a recognition action or a learning process of a human through the artificial neurons.

The neural network 100 may include a plurality of layers. For example, the neural network 100 includes an input layer 110, a hidden layer 120, and an output layer 130. The input layer 110 receives an input to be used to perform learning, and transmits the received input to the hidden layer 120, and the output layer 130 generates an output of the neural network 100 based on a signal received from the hidden layer 120. The hidden layer 120 is positioned between the input layer 110 and the output layer 130, and may change training data transmitted through the input layer 110 into a value easy to predict.

Each of the input layer 110, the hidden layer 120, and the output layer 130 may include a plurality of nodes. Nodes included in the input layer 110 may be referred to as input nodes, nodes included in the hidden layer 120 may be referred to as hidden nodes, and nodes included in the output layer 130 may be referred to as output nodes.

The input nodes included in the input layer 110 and the hidden nodes included in the hidden layer 120 may be connected to each other through edges having connection weights. The hidden nodes included in the hidden layer 120 and the output nodes included in the output layer 130 may be connected to each other through edges having connection weights.

Although FIG. 1 illustrates an example in which one hidden layer 120 is provided between the input layer 110 and the output layer 130, another example of a neural network may include a plurality of hidden layers. A neural network that includes a plurality of hidden layers are referred to as a deep neural network. The training of a deep neural network is sometimes referred to as deep learning.

For example, assuming a neural network that includes a first hidden layer, a second hidden layer, and a third hidden layer, an output of a hidden node belonging to the first hidden layer may be connected to hidden nodes belonging to the second hidden layer. An output of a hidden node belonging to the second hidden layer may be connected to hidden nodes belonging to the third hidden layer.

In such an example, hidden nodes belonging to different hidden layers may be recurrently connected to each other. A neural network in which hidden nodes that belong to different hidden layers are recurrently connected to each other is referred to as a recurrent neural network.

An apparatus for training a neural network may train the neural network 100 through supervised learning. The apparatus for training a neural network may be implemented as a software module, a hardware module, or a combination thereof. The supervised learning refers to a scheme of inputting training data and corresponding output data simultaneously into the neural network 100, and updating connection weights of edges to output data corresponding to the training data. According to one example, the apparatus that trains the neural network also extends the neural network by adding a new node and reduces a dimension of the neural network by adding an additional hidden layer. That is, the apparatus may be capable of changing a structure of a neural network based on the training data. While a neural network comprised of nodal structures is illustrated in FIG. 1, the present disclosure is not limited thereto; various data structure may be used to store the neural network in a memory storage.

The apparatus for training a neural network may update connection weights between artificial neurons through error back-propagation learning. The error back-propagation learning refers to a method of estimating errors in provided training data through forward computation, and updating connection weights to reduce errors while propagating the estimated errors in a backward direction from the output layer 130 toward the hidden layer 120 and the input layer 110. The neural network 100 may perform processing in a direction of the input layer 110 → the hidden layer 120 → the output layer 130, whereas in the error back-propagation learning, the connection weights may be updated in a direction of the output layer 130 → the hidden layer 120 → the input layer 110. One or more processor of the apparatus may use a non-transitory buffer memory to store a layer or a set of computational data to process the neural network 100 in the desired direction.

The apparatus for training a neural network may define an objective function that is used to measure optimalities of currently set connection weights. The apparatus may continuously change the connection weights based on a result of the objective function based on training data, and may iteratively perform training. For example, the objective function may be an error function to be used by the neural network 100 to calculate an error between an actual output value and an expected output value based on training data. The apparatus for training a neural network may update the connection weights to reduce a value of the error function.

As described later, the apparatus for training a neural network may extend a structure of a neural network to improve a recognition performance of the neural network. For example, when a result of the objective function does not reach a predetermined level, the apparatus for training a neural network may train the neural network while increasing a number of nodes included in the hidden layer.

Figure 2:
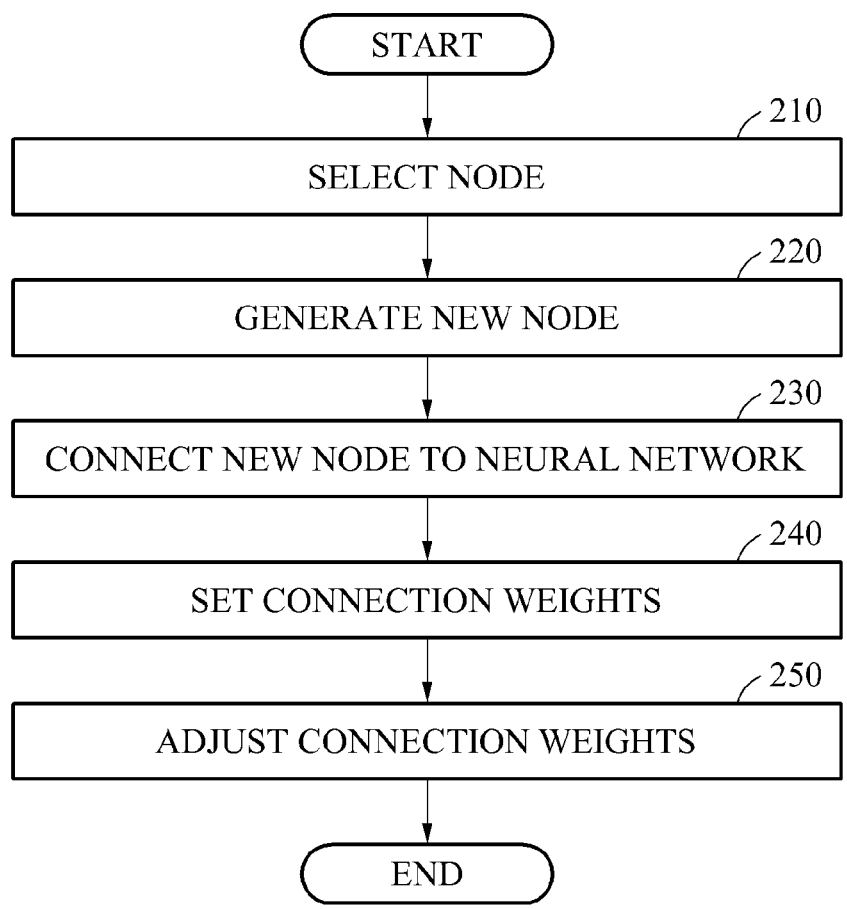
FIG. 2 is a flowchart illustrating an example of a method of extending a neural network.

FIG. 2 is a flowchart illustrating an example of a method of extending a structure of a neural network. A neural network may be utilized in various fields, for example, training based recognition, training based verification, and training based classification. As a complexity of the structure of the neural network increases or as a scale of the neural network increases, a performance of the neural network may increase. However, as the complexity of the structure of the neural network increase or as the scale of the neural network increases, a computational complexity for training the corresponding neural network may also increase. A neural network having a structure more complex than a predetermined level or having a scale greater than a predetermined level may be required for exquisite training. However, a general training method may have a limitation to optimization of the performance of the corresponding neural network.

The following examples may provide technology that trains a small-scale neural network first, and progressively extends a structure of the neural network and trains a structure-extended neural network. In this example, the neural network may be progressively trained more exquisitely while maintaining a result of learning obtained before the structure of the neural network is extended. By iteratively performing the extension of the structure of the neural network and the training, a neural network having a complexity higher than a predetermined level or having a scale greater than a predetermined level may be optimally trained. Hereinafter, an extension of a structure of a neural network will be described in detail.

Referring to FIG. 2, a method of extending a neural network involves operation 210 of selecting a node in the neural network, operation 220 of generating a new node, operation 230 of connecting the new node to the neural network, operation 240 of setting connection weights, and operation 250 of training the extended neural network to adjust connection weights of the new node.

In operation 210, at least one of nodes included in a neural network is selected. The node may be selected based on a variety of information. For example, the node may be selected based on activation frequency information and activation entropy information of the nodes. The activation frequency information may include an activation frequency of each of the nodes within a predetermined time period. The activation entropy information may include a count of transitions of each of the nodes between an active state and an inactive state within a predetermined time period.

In operation 220, a new node is generated. The new node may be generated in a layer to which the node selected in operation 210, hereinafter referred to as the "selected node", belongs. For example, the neural network may include a first hidden layer, a second hidden layer, and a third hidden layer, and a node included in the second hidden layer may be selected. In this example, a new node may be generated in the second hidden layer.

The new node may be connected to nodes included in a preceding layer and nodes included in a subsequent layer. For example, when the new node is generated in the second hidden layer, the new node may be connected to nodes included in the first hidden layer and nodes included in the third hidden layer.

In operation 230, the new node is connected to the neural network by establishing edges that connect the new node to existing nodes of the neural network.

In operation 240, connection weights of the new node are set. The connection weights of the new node may include connection weights of the edges that connect the new node to the existing nodes included in the preceding layer and connection weights of the edges that connect the new node to the nodes included in the subsequent layer.

The connection weights of the new node may be set based on connection weights of the selected node. For example, a portion of the connection weights of the new node may be set to be equal to a portion of the connection weights of the selected node. Remaining connection weights of the new node may be set to a predetermined initial value. Further, the connection weights used to set the connection weights of the new node, among the connection weights of the selected node, may be set to the predetermined initial value.

Operation 220 of generating a new node and operations 230 and 240 of connecting the new node and setting the connection weights may be understood as duplicating the node selected in operation 210. In this example, only a portion of the connection weights of the selected node may be duplicated to the new node. The connection weights duplicated from the selected node may be initialized to the predetermined initial value. Further, connection weights yet to be set, among the connection weights of the new node, may also be initialized to the predetermined initial value.

In operation 250, by performing additional training after the structure of the neural network is extended, the connection weights set by the method described above may be additionally updated. Operations 210 through 250 will be described in detail with reference to FIGS. 3 through 8.

Figure 3:
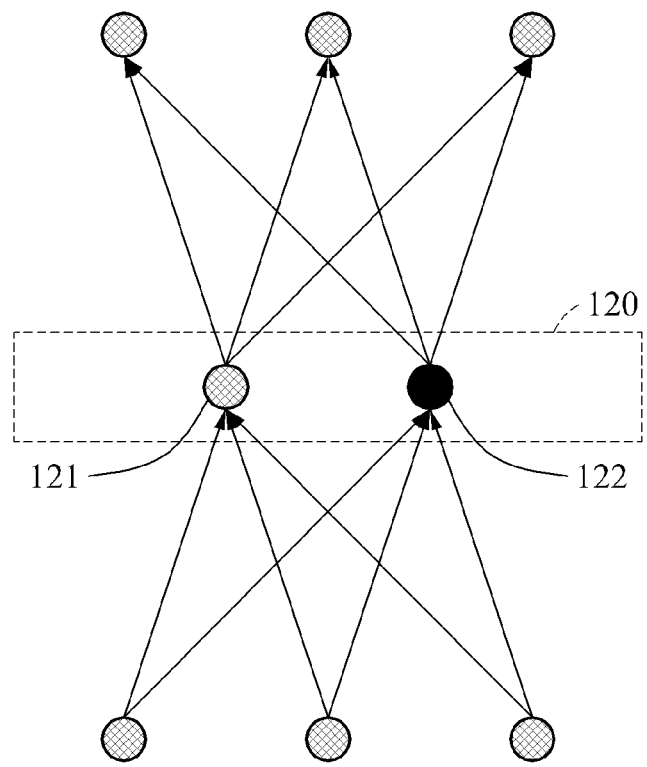
FIG. 3 is a diagram illustrating an example of a method of selecting a node.

FIG. 3 is a diagram illustrating an example of a method of selecting a node. Referring to FIG. 3, an apparatus for training a neural network may select one of nodes included in the hidden layer 120 to extend a structure of a neural network.

The apparatus for training a neural network may monitor activation patterns of hidden nodes included in the hidden layer 120. In an example, referring to FIG. 4A, an activation pattern of a first hidden node 121 may be off-on-off-off-off, and an activation pattern of a second hidden node 122 may be on-on-off-on-off. The apparatus for training a neural network may generate activation frequency information based on the activation patterns of the hidden nodes. The activation frequency information may be information indicating an activation frequency of each of the hidden nodes in the monitored activation patterns. In the example of FIG. 4A, an activation frequency of the first hidden node 121 may be "1", and an activation frequency of the second hidden node 122 may be "3".

The apparatus for training a neural network may select a node having a highest activation frequency within a predetermined time period. The node having the highest activation frequency is selected because the node having the highest activation frequency may be a node having a greatest load in the neural network. By alleviating the load of the node having the greatest load, a recognition performance of the neural network may increase. In the example of FIG. 4A, the activation frequency "3" of the second hidden node 122 is greater than the activation frequency "1" of the first hidden node 121. Thus, the second hidden node 122 may be selected.

In another example, referring to FIG. 4B, an activation pattern of the first hidden node 121 may be on-off-on-off-on, and an activation pattern of the second hidden node 122 may be on-on-on-off-off. The apparatus for training a neural network may generate activation frequency information based on the activation patterns of the hidden nodes. In the example of FIG. 4B, both an activation frequency of the first hidden node 121 and an activation frequency of the second hidden node 122 may be "3".

Further, the apparatus for training a neural network may generate activation entropy information based on the activation patterns of the hidden nodes. The activation entropy information may be information indicating a count of transitions of each of the hidden nodes between an active state and an inactive state in the monitored activation patterns. In the example of FIG. 4B, an activation entropy of the first hidden node 121 may be "4", and an activation entropy of the second hidden node 122 may be "1".

The apparatus for training a neural network may select a node having an activation entropy less than a predetermined third threshold value and an activation frequency greater than a predetermined fourth threshold value within the predetermined time period. A node having an activation frequency greater than or equal to a predetermined level and a relatively great activation entropy may have a high probability of being activated in an even distribution within the predetermined time period. In addition, a node having an activation frequency greater than or equal to a predetermined level and a relatively small activation entropy may have a high probability of being activated intensively in a specific time period during among the predetermined time period.

To increase the recognition performance of the neural network by distributing activation concentrated in a specific time period, a node having an activation entropy less than the predetermined third threshold value and an activation frequency greater than the predetermined fourth threshold value may be selected. For example, it may be assumed that both the third threshold value and the fourth threshold value correspond to "2". In the example of FIG. 4B, the activation entropy "1" of the second hidden node 122 is less than the third threshold value "2", and the activation frequency "3" of the second hidden node 122 is greater than the fourth threshold value "2". Thus, the second hidden node 122 may be selected.

Figure 5:
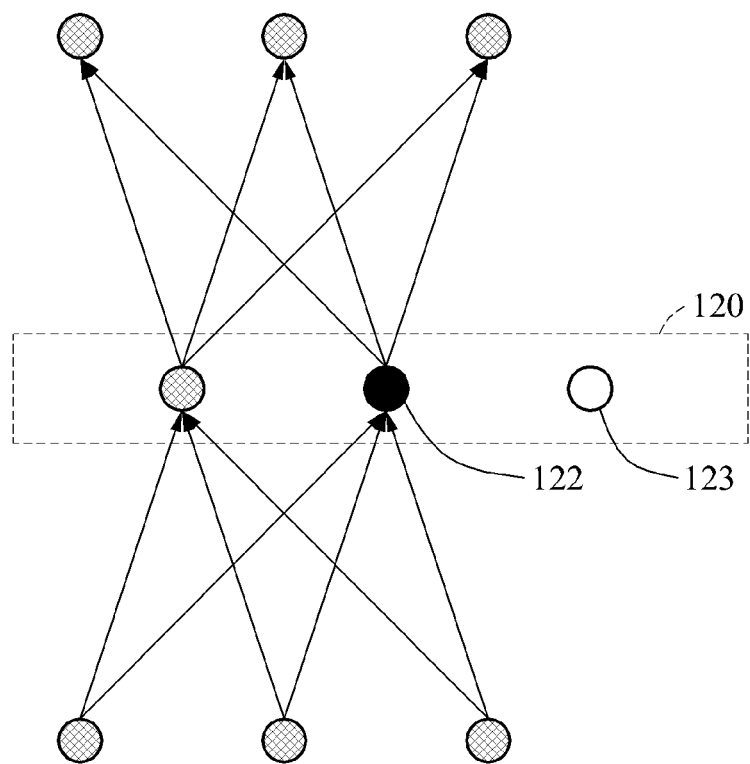
FIG. 5 is a diagram illustrating an example of a method of generating a new node.

FIG. 5 is a diagram illustrating an example of a method of generating a new node. Referring to FIG. 5, an apparatus for training a neural network may generate a new node in a layer to which a selected node belongs. For example, assuming that the second hidden node 122 is selected, the apparatus for training a neural network may generate a third hidden node 123 in the hidden layer 120 that includes the selected hidden node 122.

The apparatus for training a neural network may set an activation characteristic of the new node based on an activation characteristic of the selected node. For example, the apparatus for training a neural network may set an activation threshold value of the new node based on an activation threshold value of the selected node. Further, the apparatus for training a neural network may set an activation function of the new node based on an activation function of the selected node.

Figure 6:
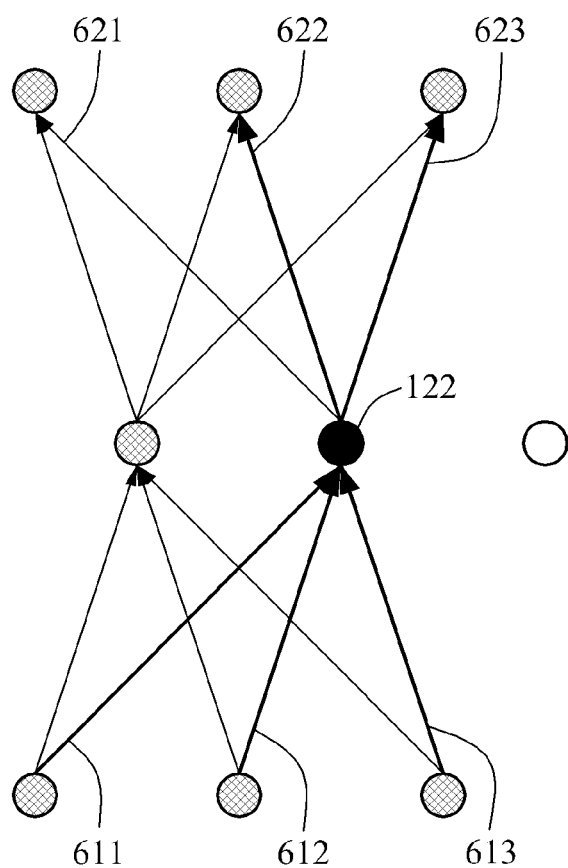
FIGS. 6 through 8 are diagrams illustrating examples of a method of setting connection weights.
Figure 7:
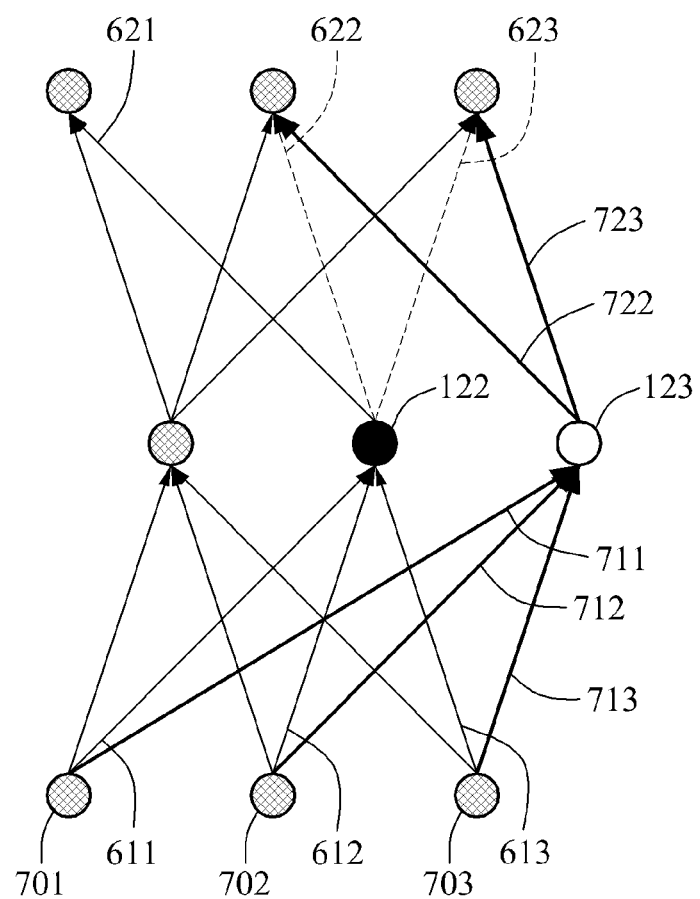
Figure 8:
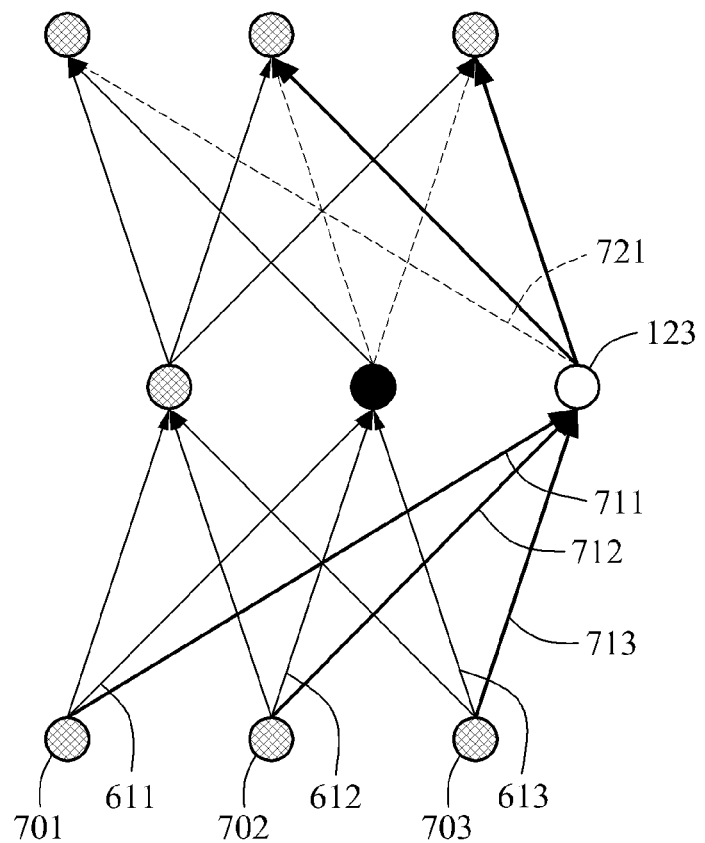

FIGS. 6 through 8 are diagrams illustrating examples of a method of connecting a new node to existing nodes and setting connection weights of the new node. An apparatus for training a neural network may set connection weights of a new node based on connection weights of a selected node. Hereinafter, an example of moving a portion of the connection weights of the selected node to the new node will be described. However, various modifications may be made to a method of setting connection weights of a new node based on connection weights of a selected node. For example, the apparatus for training a neural network may set the connection weights of the new node based on various statistics of the connection weights of the selected node.

Referring to FIG. 6, the apparatus for training a neural network may select a portion of connection weights of the selected node 122. The connection weights of the selected node 122 may include input connection weights and output connection weights. The apparatus for training a neural network may select input connection weights 611, 612, 613 of the selected node 122.

In another example, although not shown in the drawings, the apparatus for training a neural network may divide the input connection weights into a plurality of input groups, and divide the output connection weights into a plurality of output groups. The apparatus for training a neural network may select one of the plurality of input groups, and select one of the plurality of output groups.

For example, the apparatus for training a neural network may divide a first input connection weight 611 of a first input edge, a second input connection weight 612 of a second input edge, and a third input connection weight 613 of a third input edge into two input groups. The two input groups may be {the first input connection weight 611, the second input connection weight 612}, and {the third input connection weight 613}. The apparatus for training a neural network may select one of the two input groups, for example, {the third input connection weight 613}.

The apparatus for training a neural network may divide the input connection weights into a plurality of groups using various methods. In an example, the apparatus for training a neural network may divide the connection weights of the selected node 122 into a first group and a second group so that a difference between a sum of connection weights belonging to the first group and a sum of connection weights belonging to the second group is less than or equal to a predetermined fifth threshold value.

In another example, the apparatus for training a neural network may arrange the connection weights of the selected node 122 in an order of size. When the selected node 122 has a total of n connection weights, the connection weights included in a sorting list may be indexed with "1" to "n", respectively. The sorting list may include the connection weights which are sorted by value of the connection weights. The apparatus for training a neural network may classify connection weights with an index "1" and an index "n" positioned at both ends in the sorting list as a first group, and connection weights with an index "2" and an index "n−1" at both ends, among unclassified connection weights in the sorting list, as a second group. The apparatus for training a neural network may iteratively perform the foregoing process until all elements in the sorting list are classified, thereby dividing the connection weights of the selected node 122 into the first group and the second group.

The foregoing methods are provided as examples only. Various modifications may be made to the method of dividing the connection weights of the selected node 122 into the first group and the second group. In addition, the examples may be extended to a method of dividing the connection weights of the selected node 122 into at least three groups.

Further, the apparatus for training a neural network may divide the output connection weights into a plurality of groups. For example, the apparatus for training a neural network may divide a first output connection weight 621 of a first output edge, a second output connection weight 622 of a second output edge, and a third output connection weight 623 of a third output edge into two output groups. The two output groups may be {the first output connection weight 621}, and {the second output connection weight 622, the third output connection weight 623}. The apparatus for training a neural network may select one of the two output groups, for example, {the second output connection weight 622, the third output connection weight 623}.

The apparatus for training a neural network may select connection weights belonging to one of the divided groups. For example, the apparatus for training a neural network may select one of the divided groups using a predetermined method, for example, a random selection method, and select connection weights belonging to the selected group.

Referring to FIG. 7, an apparatus for training a neural network may use a selected portion of connection weights of the selected node 122 for setting connection weights of the new node 123. For example, the apparatus for training a neural network may select all input connection weights 611, 612, 613 of the selected node 122. The input connection weights 611, 612, 613 of the selected node 122 may be connection weights of edges connecting input nodes 701, 702, 703 to the selected node 122. The apparatus for training a neural network may copy the selected input connection weights 611, 612, 613 of the selected node 122 to the new node 123. The apparatus for training a neural network may set connection weights 711, 712, 713 of edges connecting the input nodes 701, 702, 703 to the new node 123 to be equal to the input connection weights 611, 612, 613.

The apparatus for training a neural network may select a portion of the output connection weights 621, 622, 623 of the selected node 122. For example, the apparatus for training a neural network may select the output connection weights 622, 623 out of the output connection weights 621, 622, 623 of the selected node 122. The apparatus for training a neural network may move the selected output connection weights 622, 623 to the new node 123. The apparatus for training a neural network may set a connection weight 722 to be equal to the output connection weight 622, and set a connection weight 723 to be equal to the output connection weight 623. The apparatus for training a neural network may set the connection weight 722 and the connection weight 723, and initialize the output connection weight 622 and the output connection weight 623. For example, the apparatus for training a neural network may set the output connection weight 622 and the output connection weight 623 to a predetermined initial value.

Examples may avoid a co-adaptation issue occurring in deep learning by moving output connection weights in index units. The co-adaptation issue may be an issue causing a waste of nodes since a plurality of nodes are trained and output as like a single node when the plurality of nodes have similar output connection weights. Examples may distribute output connection weights to a new node in index units, thereby avoiding the co-adaptation issue.

Referring to FIG. 8, an apparatus for training a neural network may initialize remaining connection weights of the new node 123. The remaining connection weights of the new node 123 may comprise a connection weight which has not been set, among the connection weights of the new node 123. For example, a connection weight 721 of the new node 123 may be the remaining connection weight of the new node 123. The apparatus for training a neural network may detect the connection weight 721 as the remaining connection weights of the new node 123, and set the connection weight 721 to a predetermined initial value.

Although for ease of description, a case in which a single node is selected and a single new node is generated is described above, the examples may also be applicable to a case in which a plurality of nodes are selected and a plurality of new nodes are generated.

Various modifications may be made to a method of setting connection weights of a new node based on connection weights of a selected node. In an example, a portion of the input connection weights of the selected node and a portion of the output connection weights of the selected node may be moved to the new node. In another example, all of the output connection weights of the selected node may be duplicated to the new node, and only a portion of the input connection weights may be moved to the new node.

Figure 9:
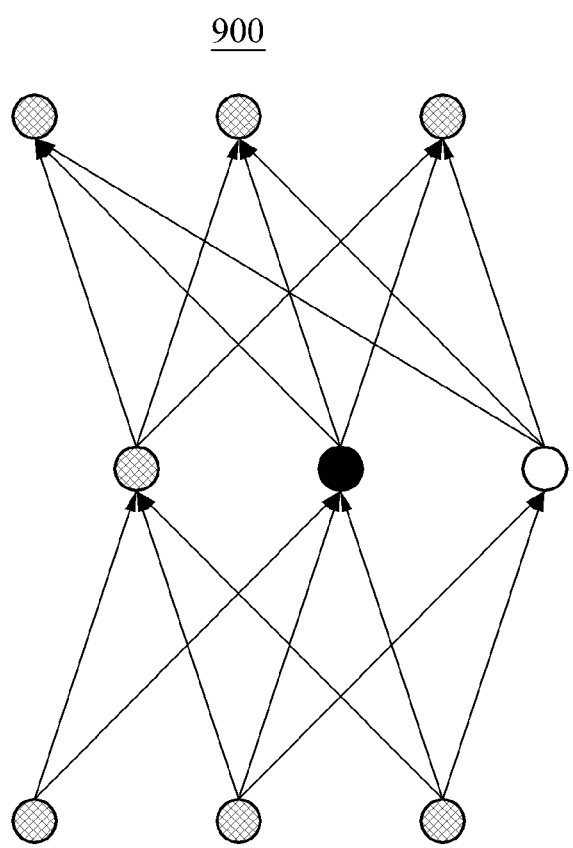
FIG. 9 is a diagram illustrating an example of a method of performing additional training after a structure of a neural network is extended.

FIG. 9 is a diagram illustrating an example of a method of performing additional training after a structure of a neural network is extended. Referring to FIG. 9, an apparatus for training a neural network may update connection weights by training a neural network 900 of a structure extended to include a new node.

The apparatus for training a neural network may provide technology that reduces a training time by reusing a pre-trained neural network. Further, the apparatus for training a neural network may provide technology that progressively increases a recognition performance of a neural network by progressively extending a structure of a pre-trained neural network and training a structure-extended neural network.

The apparatus for training a neural network may provide technology that enables deep learning, without performing pre-training for each layer. The apparatus for training a neural network may enable deep learning to optimize a deep neural network, while sharing an objective function of classification in the entire training process, for example, in all layers within the neural network, through the method described above.

Figure 10:
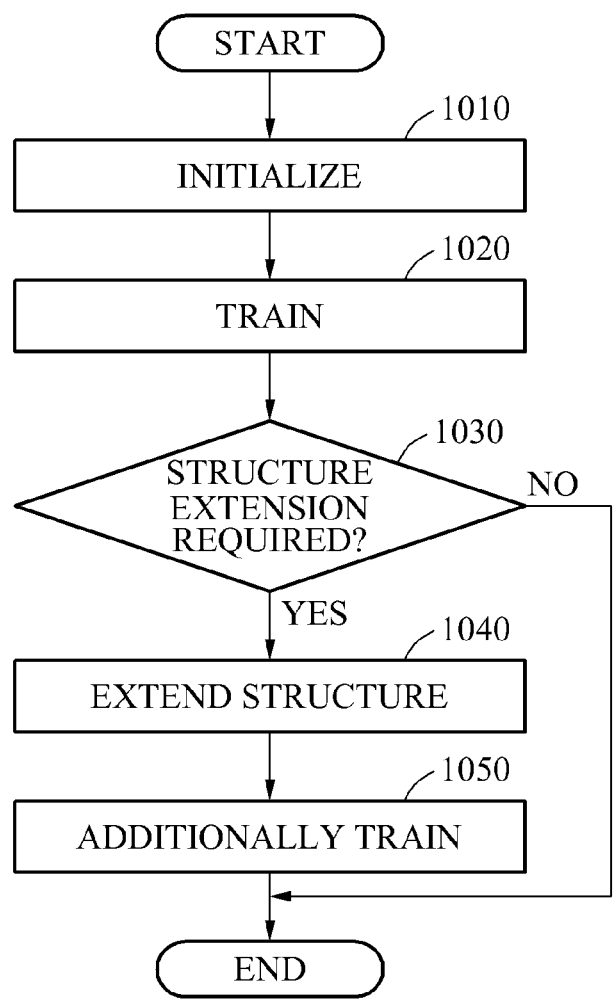
FIG. 10 is a flowchart illustrating an example of a method of extending a neural network.
Figure 11B:
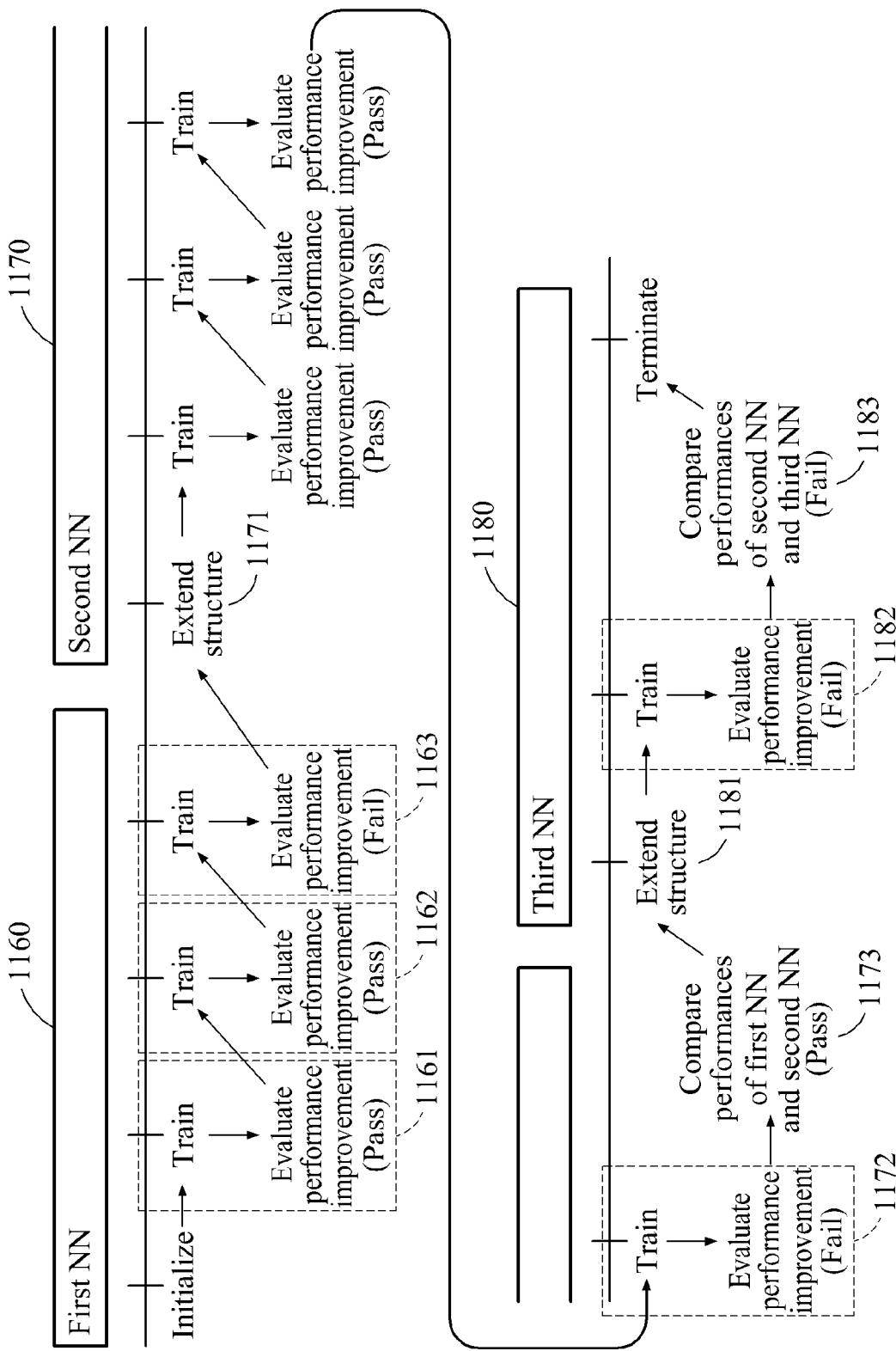
FIG. 11B is a flow diagram illustrating a progressive change in a neural network though several iterations of extension using an example of a method of extending a neural network.

FIGS. 10, 11A and 11B illustrate examples of methods of extending a neural network. Referring to FIG. 10, in operation 1010, a neural network is initialized. For example, an initial structure of the neural network, and initial connection weights within the neural network may be set. In operation 1020, the neural network is trained. The training data may be obtained from a training data storage, and computations may be performed by a processor while activation patterns are monitored throughout the neural network. For example, the neural network may be trained through supervised learning, or error back-propagation learning.

In operation 1030, whether an extension of a structure of the neural network is required is determined. In an example, a performance of a neural network trained up to date may be evaluated. The performance may refer to whether the neural network performed an analysis with accuracy. When the performance of the neural network trained up to data is less than a predetermined threshold value, the extension of the structure of the neural network may be determined to be required. That is because an increase in a number of nodes within the neural network may be required to increase a performance of a task assigned to the neural network. The task may include, for example, recognition, verification, and classification.

In another example, whether the extension of the structure of the neural network is required may be determined based on an external input. When an input to instruct to extend the structure of the neural network is received in operation 1030, the extension of the structure of the neural network may be determined to be required. The input to instruct to extend the structure of the neural network may be received in various manners, for example, through a user interface.

When the extension of the structure of the neural network is determined to be required in operation 1030, the structure of the neural network is extended in operation 1040. The descriptions provided with reference to FIGS. 2 through 8 may be applicable to operation 1040 and thus, duplicated descriptions will be omitted for conciseness. In operation 1050, a neural network of the extended structure is additionally trained. When the extension of the structure of the neural network is determined to not be required in operation 1030, the training of the neural network may be terminated without performing the extension of the structure or additional training.

Referring to FIG. 11A, in operation 1110, a neural network is initialized. In operation 1120, the neural network is trained. In operation 1130, whether an extension of a structure of the neural network is required is determined. Operations 1120 and 1130 may constitute a training epoch. In operation 1120, the neural network may be trained based on a predetermined quantity of training data for a single training epoch. In operation 1130, a level of performance improvement in the corresponding training epoch may be evaluated, and whether the extension of the structure of the neural network is required may be determined based on a result of the evaluating.

For example, when the level of performance improvement in the corresponding training epoch is greater than a predetermined first threshold value, additional training of a neural network of a current structure may be considered. Thus, the extension of the structure of the neural network may be determined to not be required. Conversely, when the level of performance improvement in the corresponding training epoch is less than the predetermined first threshold value, the performance of the neural network of the current structure may be determined to be saturated. Thus, the extension of the structure of the neural network may be determined to be required.

When the extension of the structure of the neural network is determined to be required, whether a training termination condition of the neural network is satisfied is determined in operation 1140. In this example, a performance of the neural network of the current structure may be compared to a performance of a neural network of a previous structure, and whether the training termination condition of the neural network is satisfied may be determined based on a result of the comparing. The neural network of the previous structure may refer to a neural network before a structure of the neural network is extended to the current structure of the neural network.

For example, when a difference between the performance of the neural network of the current structure and the performance of the neural network of the previous structure is greater than a predetermined second threshold, a performance improvement by an additional extension of a structure may be expected. Thus, the training termination condition of the neural network may be determined to not be satisfied. Conversely, when the difference between the performance of the neural network of the current structure and the performance of the neural network of the previous structure is less than the predetermined second threshold, a performance improvement by an additional extension of a structure may not be expected. Thus, the training termination condition of the neural network may be determined to be satisfied.

When the training termination condition of the neural network is not satisfied, the structure of the neural network is extended in operation 1150. Operations 1120 through 1150 may be performed iteratively until the training termination condition of the neural network is satisfied.

Referring to FIG. 11B, a first neural network 1160 may be initialized. In a first training epoch 1161, the first neural network 1160 is trained, and a level of performance improvement is evaluated. As a result of training the first neural network 1160 in the first training epoch 1161, the apparatus may determine that the level of performance improvement is greater than a first threshold value. In this example, in response to a result of evaluating the performance improvement corresponding to "Pass", an apparatus for extending the neural network determines that an extension of a structure is determined to not be required yet. In a second training epoch 1162, training and performance improvement evaluation are performed. As a result of training the first neural network 1160 in a third training epoch 1163, a level of performance improvement may be less than the first threshold value. In this example, a result of evaluating the performance improvement may correspond to "Fail", and the extension of the structure may be determined to be required.

A second neural network 1170 may be generated by extending a structure of the first neural network 1160 in operation 1171. In each of a plurality of training epochs, the second neural network 1170 may be trained, and a level of performance improvement in the corresponding training epoch may be evaluated. As a result of training the second neural network 1170 in a fourth training epoch 1172, the level of performance improvement may be less than the first threshold value. In this example, a result of evaluating the performance improvement may correspond to "Fail", and the extension of the structure may be determined to be required.

Before an extension of a structure of a neural network is performed, whether a training termination condition of the neural network is satisfied may be determined by comparing a performance of a neural network of a current structure to a performance of a neural network of a previous structure. That is because an expectation of an improvement in the performance of the neural network by an additional extension of the structure may be difficult when the structure of the neural network is sufficiently great.

In operation 1173, the performance of the second neural network 1170 is compared to the performance of the first neural network 1160. As a result of the comparing, a difference between the performance of the second neural network 1170 and the performance of the first neural network 1160 may be greater than a second threshold value. In this example, a result of comparing the performances may correspond to "Pass", and the training termination condition of the neural network may be determined to not be required.

A third neural network 1180 may be generated by extending a structure of the second neural network 1170 in operation 1181. As a result of training the third neural network 1180 in a fifth training epoch 1182, a level of performance improvement may be less than the first threshold value. In this example, a result of evaluation the performance improvement may correspond to "Fail", and an extension of a structure may be determined to be required. In operation 1183, the performance of the third neural network 1180 is compared to the performance of the second neural network 1170. As a result of the comparing, a difference between the performance of the third neural network 1180 and the performance of the second neural network 1170 may be less than the second threshold value. In detail, the level of performance improvement through the extension of the structure may be less than the second threshold value. In this example, a result of comparing the performances may correspond to "Fail", and the training termination condition of the neural network may be determined to be satisfied.

Figure 12:
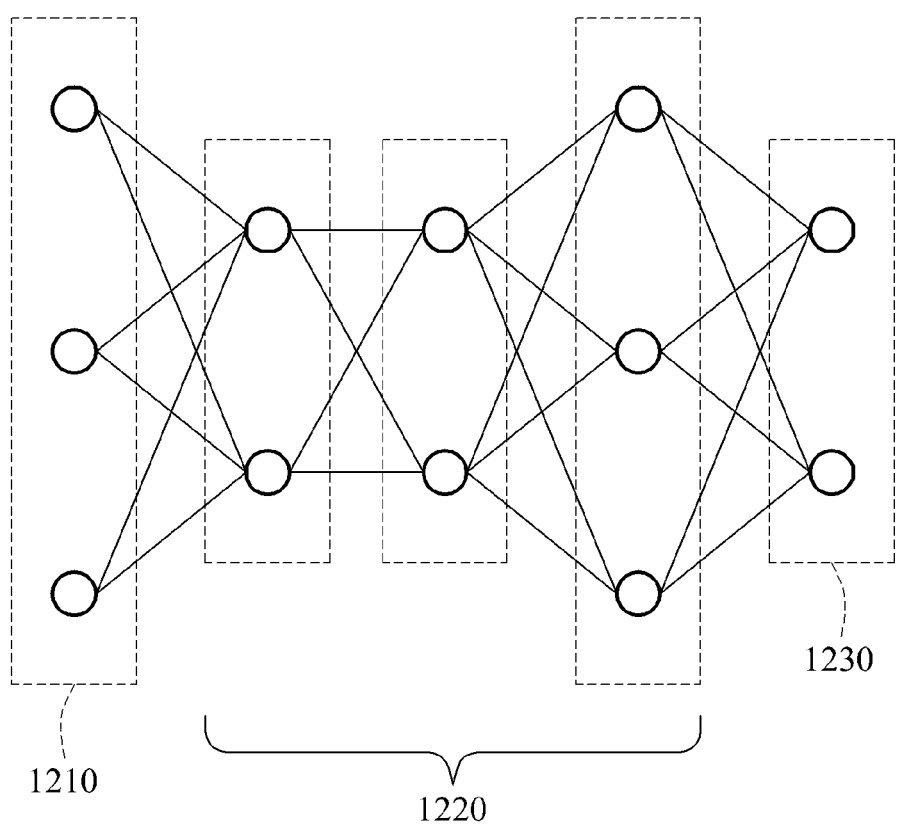
FIGS. 12 and 13 are diagrams illustrating examples of neural networks trained by a method of extending a neural network.
Figure 13:
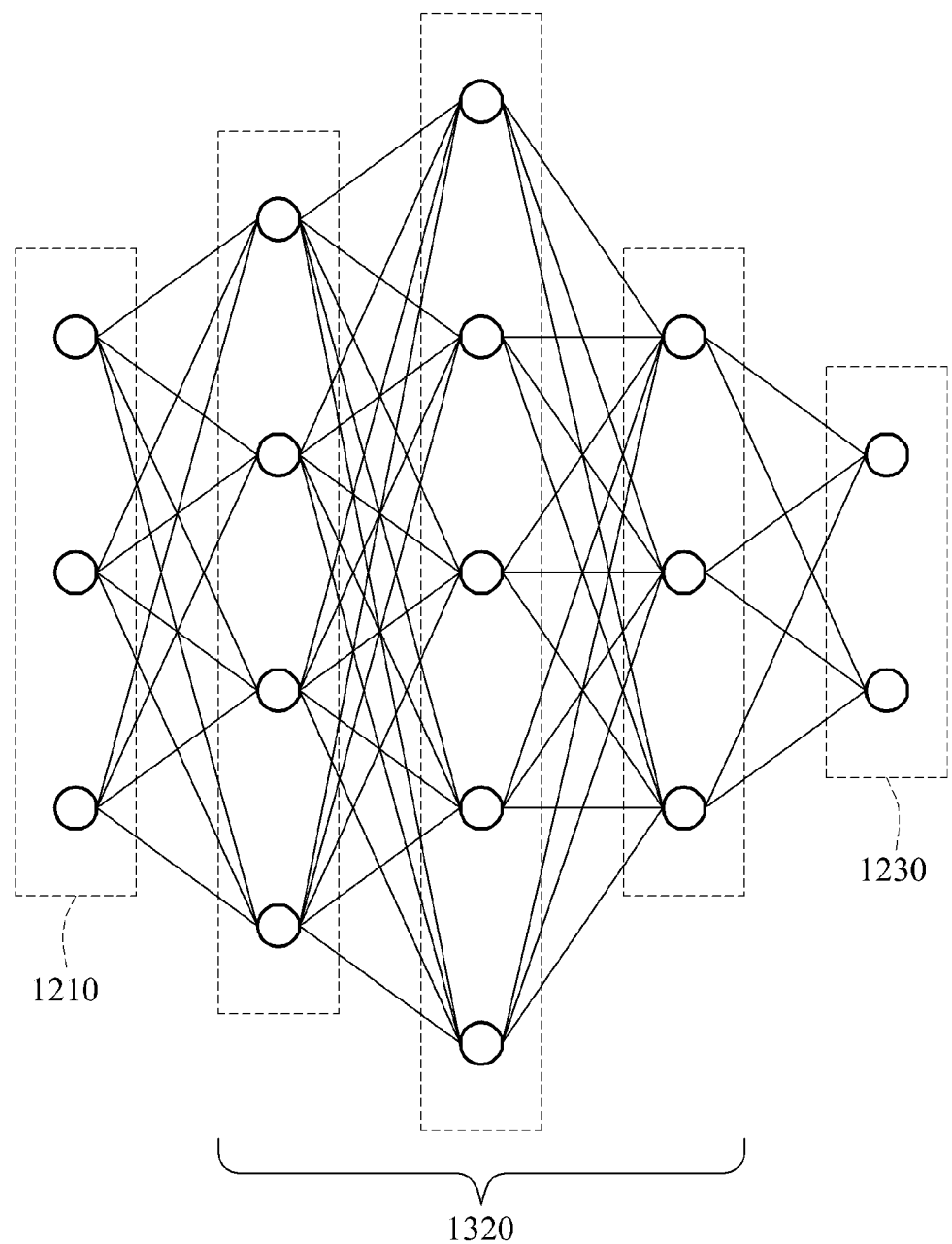

FIGS. 12 and 13 are diagrams illustrating examples of a neural network trained by a method of extending a structure of a neural network. Referring to FIG. 12, a neural network 1200 includes an input layer 1210, a plurality of hidden layers 1220, and an output layer 1230. Each of the plurality of hidden layers 1220 may be initialized to include nodes fewer than or equal to a predetermined number. Such an initialization operation may be performed in operation 1010 of FIG. 10 or operation 1110 of FIG. 11A.

The neural network 1200 may be trained while extending a structure thereof through operations 1020 through 1050 of FIG. 10 or operations 1120 through 1150 of FIG. 11A. A new node may be generated in the hidden layers 1220 of the neural network 1200 in operation 1040 of FIG. 10 or operation 1150 of FIG. 11A. Referring to FIG. 13, a trained neural network 1300 includes structure-extended hidden layers 1320.

Figure 14:
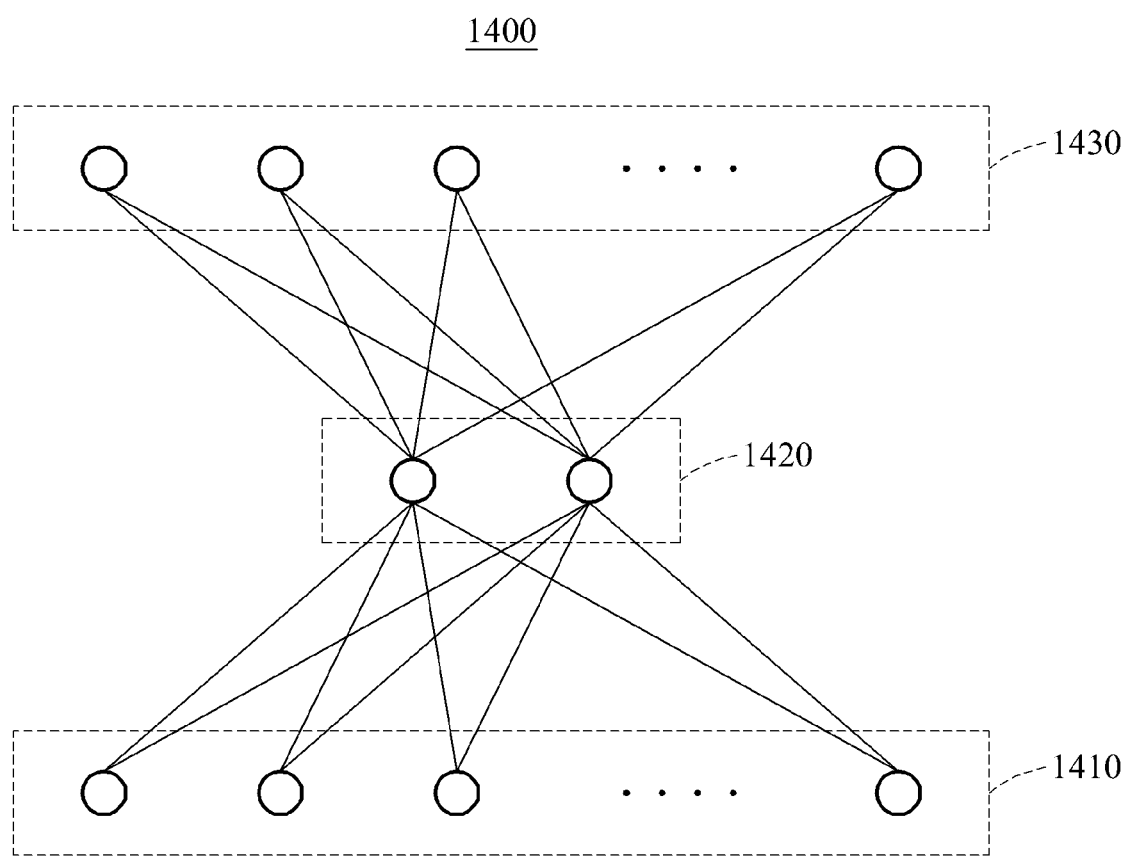
FIGS. 14 and 15 are diagrams illustrating examples of auto-encoders trained by a method of extending a neural network.
Figure 15:
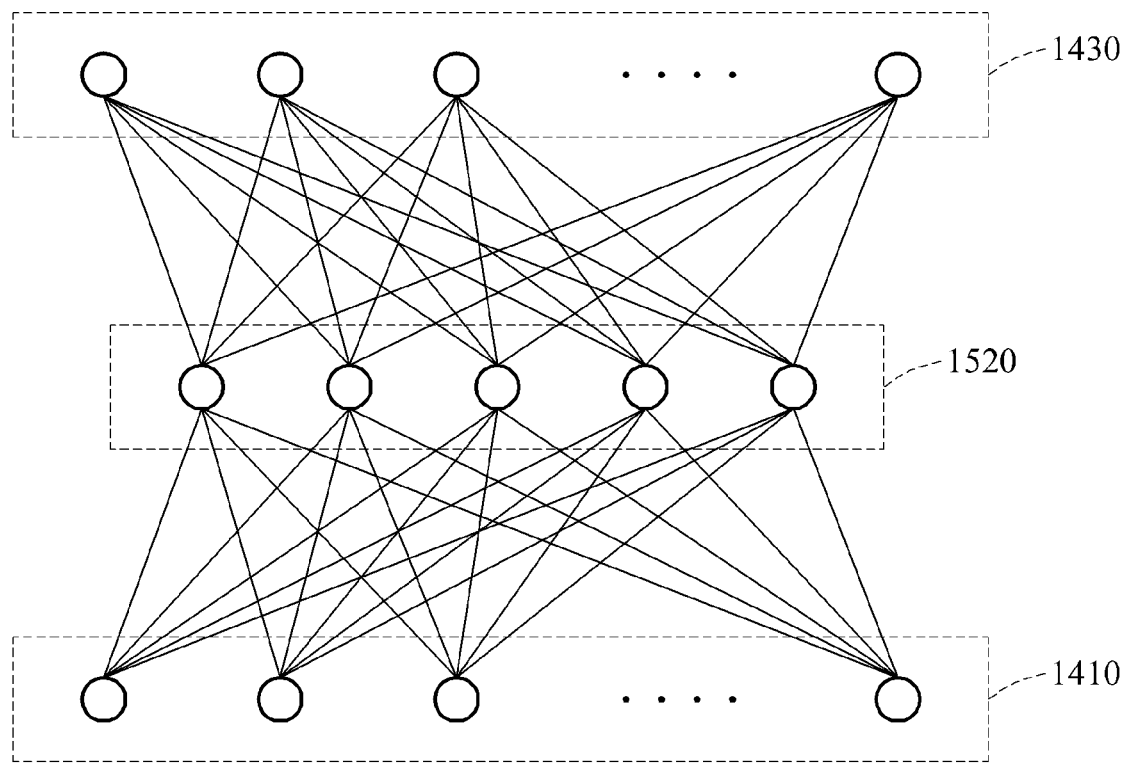

FIGS. 14 and 15 are diagrams illustrating examples of an auto-encoder trained by a method of extending a neural network. An auto-encoder may be a neural network configured to perform dimension reduction. Referring to FIG. 14, an auto-encoder 1400 includes an input layer 1410, a hidden layer 1420, and an output layer 1430.

The input layer 1410, the hidden layer 1420, and the output layer 1430 may be initialized based on an input dimension of the auto-encoder 1400. For example, a number of nodes included in the input layer 1410 may be determined based on the input dimension. A number of nodes included in the output layer 1430 may be determined to be equal to the number of nodes included in the input layer 1410. A number of nodes included in the hidden layer 1420 may be determined to be a predetermined initial value, for example, "2".

In the auto-encoder 1400, a structure of the input layer 1410→ the hidden layer 1420 may be symmetric to a structure of the hidden layer 1420→ the output layer 1430. In the auto-encoder 1400, the input layer 1410→ the hidden layer 1420 may correspond to encoding, and the hidden layer 1420→ the output layer 1430 may correspond to decoding.

The auto-encoder 1400 may reduce the input dimension through encoding, and restore the reduced input dimension through decoding. An objective function of the auto-encoder 1400 may demand that input values be equal to output values. Since the auto-encoder 1400 is configured to perform dimension reduction, the predetermined initial value for the hidden layer 1420 may need to be less than the input dimension. The initialization operation described above may be performed in operation 1010 of FIG. 10 or operation 1110 of FIG. 11A.

The auto-encoder 1400 may be trained while extending a structure thereof through operations 1020 through 1050 of FIG. 10 or operations 1120 through 1150 of FIG. 11A. A new node may be generated in the hidden layer 1420 of the auto-encoder 1400 in operation 1040 of FIG. 10 or operation 1150 of FIG. 11A.

A dimension reduction apparatus may initialize a number of nodes included in the hidden layer 1420 to a possible small value, and train the auto-encoder 1400 while extending the hidden layer 1420. The dimension reduction apparatus may be implemented as a software module, a hardware module, or a combination thereof. Further, the dimension reduction apparatus may be included in or formed as a part of an apparatus for extending a neural network as illustrated in FIGS. 2-13, 16, 19 and 20.

Referring to FIG. 15, when a performance of an auto-encoder 1500 is greater than or equal to a predetermined level, training of the auto-encoder 1500 may be terminated. The auto-encoder 1500 may include a structure-extended hidden layer 1520. A number of nodes included in the hidden layer 1520 may correspond to a result of reducing an input dimension.

Although not shown in the drawings, an auto-encoder may also include a plurality of hidden layers. For example, the auto-encoder may include an input layer, first hidden layers, a central hidden layer, second hidden layers, and an output layer. To maintain a basic operation of the auto-encoder, a structure of the input layer→ the first hidden layers→ the central hidden layer may be symmetric to a structure of the central hidden layer→ the second hidden layers and the output layer. When the structures of the hidden layers are extended, the first hidden layers and the third hidden layers may maintain symmetry.

Figure 16:
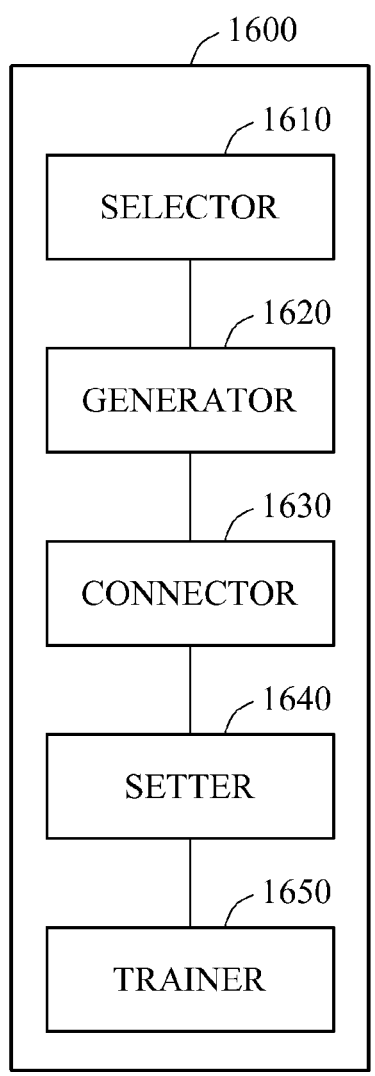
FIG. 16 is a block diagram illustrating an example of an apparatus for extending and training a neural network.

FIG. 16 is a block diagram illustrating an example of an apparatus for training a neural network. Referring to FIG. 16, an apparatus 1600 for training a neural network includes a selector 1610, a generator 1620, a connector 1630, a setter 1640 and a trainer 1650. The selector 1610, the generator 1620, the connector 1630, the setter 1640 and the trainer 1650 may include one or more processor and non-transitory memory. The selector 1610 may select at least one of nodes included in a neural network to extend a structure of the neural network. The generator 1620 may generate a new node in a layer to which the selected node belongs. The connector 1630 connects the new node to the existing nodes. The setter 1640 may set connection weights of the new node based on connection weights of the selected node. The trainer 1640 may adjust the connection weights of the new node and existing nodes by training the neural network with training data. The training data may be retrieved from a memory storage.

Figure 17:
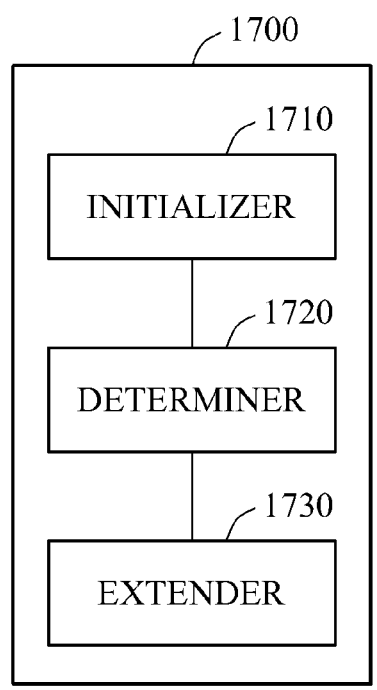
FIG. 17 is a block diagram illustrating an example of an apparatus for reducing a dimension of a neural network.

FIG. 17 is a block diagram illustrating an example of a dimension reduction apparatus. Referring to FIG. 17, a dimension reduction apparatus 1700 includes an initializer 1710, a determiner 1720, and an extender 1730. The initializer 1710, the determiner 1720, and the extender 1730 may include one or more processor and non-transitory memory. The initializer 1710 may initialize an input layer, a hidden layer, and an output layer of a neural network based on an input dimension. The determiner 1720 may determine whether an extension of the hidden layer is required while training the neural network. The extender 1730 may extend the hidden layer in response to a determination that the extension of the hidden layer is required.

The descriptions provided with reference to FIGS. 1 through 15 may be applicable to each module of FIGS. 16 and 17 and thus, duplicated descriptions will be omitted for conciseness.

Figure 19:
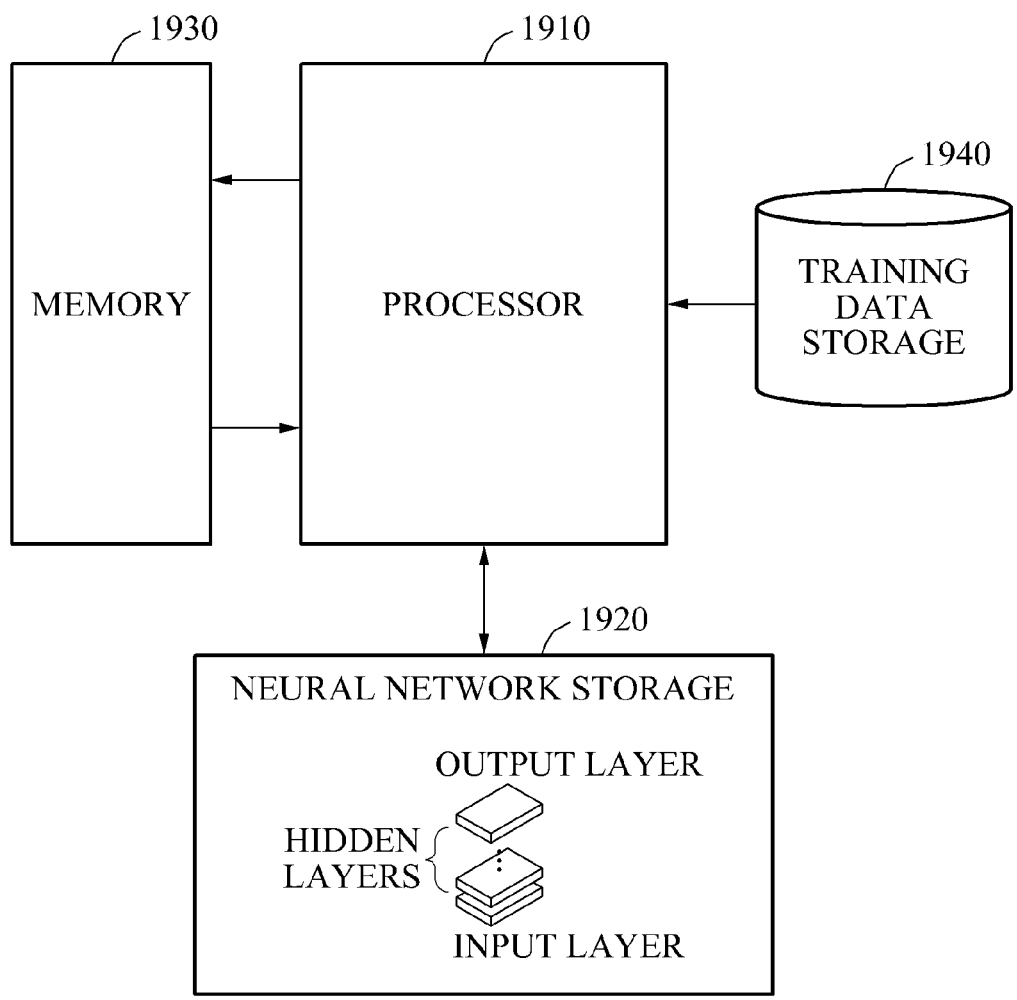
FIG. 19 is a block diagram illustrating an example of an apparatus for extending a neural network.

FIG. 19 illustrates an example of an apparatus for extending a neural network. The descriptions of examples of methods and apparatus for extending a neural network provided with reference to FIGS. 1 to 18 applies to the example illustrated in FIG. 19. Thus, repetitive descriptions thereof are omitted.

Referring to FIG. 19, the apparatus includes a processor 1910, a neural network memory storage 1920, a memory 1930 for storing calculated values, and a training data storage 1940. While a singular term is used to describe the processor 1910 for simplification, those skilled in the art understands that the processor 1910 may include more processors or more cores. The processor 1910 may operate inside a computing device having a plurality of multi-core processors, for example. In one example, the multi-core processor may be a general-purpose graphic processing unit (GPGPU). In another example, each of the multi-core processors may be a field-programmable gate array (FPGA), or a customizable multi-core processor. In another example, the processor 1910 may exchange data through an internal bus, such as a peripheral component interconnect express (PCIe) bus. In another example, the processor may be a single-core processor.

According to one example, the processor 1910 may use a pipelined algorithm to process a neural network stored in the neural network storage 1920 layer by layer. The neural network storage 1920 may store a neural network having a plurality of layers. For example, the neural network may have equal to or more than three layers. The training data stored in the training data storage 1940 may provide an input to an input layer of a neural network stored in the neural network memory storage 1920. For example, to train the neural network to recognize patterns of hand-written English, the training data may include digital images of handwritings and a corresponding text characters recognized from the images. The corresponding text characters may be used to determine the performance of the neural network. To train the neural network for speech recognition, the training data may include audio recording samples or speech corpus.

The computations performed by the processor 1910, including nodal activation patterns of the neural network and the connection weights to be assigned to edges, may be stored in the memory 1930 while the neural network is being trained. According to one example, the neural network stored in the neural network memory storage 1920 may be continually updated by adding a new node or an additional hidden layer by the processor 1910 while being trained.

Figure 20:
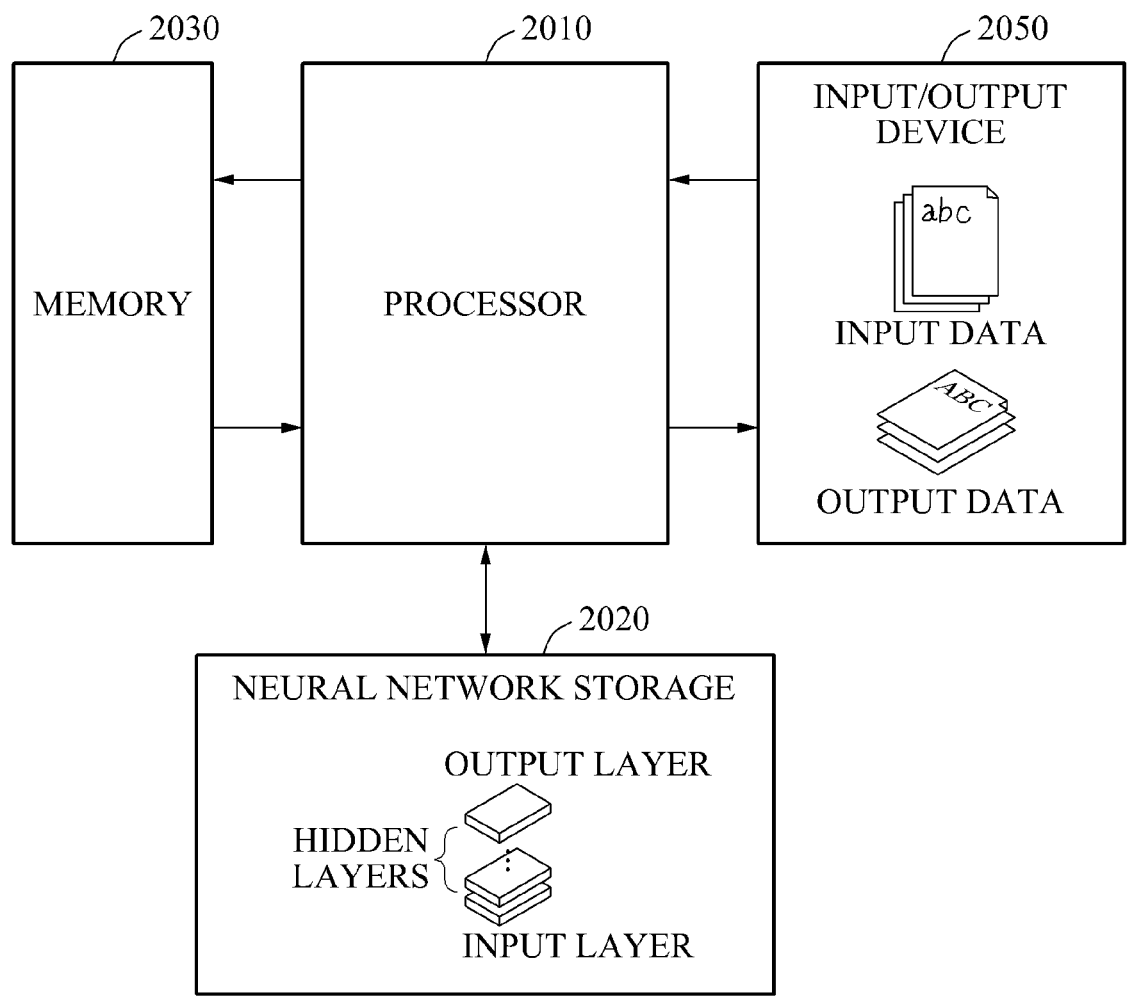
FIG. 20 is a block diagram illustrating an example of an apparatus for extending a neural network that also analyzes input data with the neural network.

FIG. 20 illustrates an example of an apparatus for extending a neural network that is used to perform data analysis. The descriptions of examples of methods and apparatus for extending a neural network provided in reference to FIGS. 1 to 19 applies to the example illustrated in FIG. 20. Thus, repetitive descriptions thereof are omitted.

After the neural network is sufficiently trained, the extended neural network may be used to process input data. For example, the processor 2010 may retrieve an input data, such as a digital handwriting, from a memory or an input/output device. Examples of the input/output devices includes, but is not limited to, a keyboard, a display device, a touch screen, a printer and the like. The processor 2010 may feed the input data into an input layer of an extended neural network stored in the neural network memory storage 2220. Using the extended neural network, the processor 2010 may perform, for example, a character recognition to convert the input data into an output data comprising recognized texts.

While an example of a processor 2010 that trains, extends, and changes dimensions of a neural network as well as analyzing an input is provided in FIG. 20, the present disclosure is not limited thereto. In another example, the neural network extension and the data analysis may occur in two separate devices.

Further, the illustrated examples are provided for the purpose of furthering the understanding of the present disclosure, and is not intended to limit the scope of any claims. Those skilled in the field would readily perceive variations in the components used and the arrangements of components, and such variations are within the scope of the present disclosure.

The units, apparatus, modules, elements, trainers, initializers, determiners, extenders, generators, selectors, setters that perform the various operations and methods described above may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Functional programs, codes, and code segments for implementing the examples disclosed herein can be easily constructed by a programmer skilled in the art to which the examples pertain based on the drawings and their corresponding descriptions as provided herein.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, the method comprising:
implementing a neural network;
generating activation frequency information based on determined activation patterns of nodes of the implemented neural network;
determining a node of the neural network using the generated activation frequency information;
extending the neural network by adding a new node in a layer, of the neural network, that includes the determined node;
configuring a selected portion of connection weights of the new node, using a selected portion of connection weights of the determined node;
configuring at least a remaining portion of the connection weights of the new node, using a predetermined initial value; and
implementing the extended neural network with the configured connection weights of the new node,
wherein the determining of the node of the neural network comprises determining at least one node of the implemented neural network based on the generated activation frequency information and generated activation entropy information of the nodes in the implemented neural network, and
wherein a node having an activation entropy less than a predetermined third threshold value and an activation frequency greater than a predetermined fourth threshold value within a predetermined time period is determined to be the determined node among the nodes in the implemented neural network.

2. The method of claim 1, further comprising:
determining whether an extension of the implemented neural network is required.

3. The method of claim 2, wherein the determining of whether the extension of the implemented neural network is required comprises:
monitoring a performance of the implemented neural network; and
determining that the extension of the implemented neural network is required in response to a level of performance improvement of the implemented neural network being less than a predetermined first threshold value.

4. The method of claim 2, wherein the determining of whether the extension of the implemented neural network is required comprises:
monitoring a performance of the implemented neural network; and
terminating training in response to a level of performance improvement of the implemented neural network being less than a predetermined first threshold value, and a level of performance improvement of the implemented neural network after a previous extension of the implemented neural network is performed being less than a predetermined second threshold value.

5. The method of claim 1, wherein the activation frequency information comprises an activation frequency of each node of the nodes in the implemented neural network within a predetermined time period.

6. The method of claim 1, wherein the activation entropy information comprises a count of transitions of each node of the nodes in the implemented neural network between an active state and an inactive state within a predetermined time period.

7. The method of claim 1, wherein a node having a highest activation frequency within a predetermined time period is determined to be the determined node among the nodes in the implemented neural network.

8. The method of claim 1, wherein the adding comprises:
connecting the new node to nodes included in a layer preceding the layer; and
connecting the new node to nodes included in a layer subsequent to the layer.

9. The method of claim 1, wherein the layer including the determined node is a hidden layer of the implemented neural network.

10. The method of claim 1, wherein the configuring further comprises:
selecting the selected portion of the connection weights of the determined node.

11. The method of claim 10, wherein the selecting of the selected portion of the connection weights of the determined node further comprises:
dividing the connection weights of the determined node into a first group and a second group; and
selecting connection weights, belonging to one of the first group and the second group, as the selected portion of the connection weights of the determined node.

12. The method of claim 1, wherein the configuring further comprises:
setting input connection weights of the new node based on input connection weights of the determined node;
selecting a portion of output connection weights of the determined node;
setting connection weights corresponding to the selected portion of the output connection weights, among the connection weights of the new node, based on the selected portion of the output connection weights; and
setting the selected portion of the output connection weights of the determined node to the predetermined initial value.

13. The method of claim 1, further comprising:
configuring an activation characteristic of the new node based on an activation characteristic of the determined node.

14. The method of claim 1, wherein the implementing of the extended neural network further includes training the extended neural network to generate a trained neural network and to store the trained neural network.

15. The method of claim 1, wherein an initial structure of the implemented neural network comprises a plurality of hidden layers comprising nodes fewer than or equal to a predetermined number.

16. The method of claim 15, wherein the determining of the node of the neural network further comprises determining at least one node of the plurality of hidden layers to be selected.

17. A non-transitory computer-readable storage medium storing instructions to cause a computer to perform the method of claim 1.

18. A processor-implemented method, the method comprising:
implementing a neural network;
selecting a node of the neural network;

extending the neural network by adding a new node in a layer, of the neural network, that includes the selected node;
configuring a selected portion of connection weights of the new node, using a selected portion of connection weights of the selected node,
wherein the configuring comprises:
dividing the connection weights of the selected node into a first group and a second group so that a difference between a sum of connection weights belonging to the first group and a sum of connection weights belonging to the second group is less than or equal to a predetermined fifth threshold value;
selecting connection weights belonging to one of the first group and the second group; and
configuring at least the selected portion of the connection weights of the new node, using the connection weights of the selected group; and
implementing the extended neural network with the configured selected portion of the connection weights of the new node.

19. A processor-implemented method of performing dimension reduction in a neural network, the method comprising:
training the neural network comprising an input layer, one or more hidden layers, and an output layer;
determining whether an extension of a hidden layer, among the one or more hidden layers of the neural network, is required during the training of the neural network;
generating activation frequency information based on determined activation patterns of nodes of the one or more hidden layers of the neural network; and
in response to a determination that the extension of the hidden layer is required, performing the dimension reduction by:
determining a node of the hidden layer using the generated activation frequency information;
extending the hidden layer by adding a new node to the hidden layer including the determined node;
configuring a selected portion of connection weights of the new node, using a selected portion of connection weights of the determined node in the hidden layer; and
configuring at least a remaining portion of the connection weights of the new node, using a predetermined initial value,
wherein the determining of the node of the hidden layer using the generated activation frequency information comprises determining the determined node based on the generated activation frequency information and generated activation entropy information of the nodes of the neural network.

20. The method of claim 19, further comprising initializing the neural network prior to the training of the neural network, the initializing comprising:
generating a plurality of input nodes in the input layer, a number of the plurality of input nodes being determined to correspond to input dimension of the neural network;
generating at least one node corresponding to the predetermined initial value in the one or more hidden layer; and
generating a plurality of output nodes in the output layer, a number of the plurality of output nodes being determined to correspond to the input dimension.

21. The method of claim 19, wherein the determining of whether the extension of a hidden layer, among the one or more hidden layers of the neural network, is required comprises:
monitoring a performance of the neural network based on differences between values input into the input layer and values output from the output layer; and
determining that an extension of a structure of the neural network is required in response to a level of performance improvement of the neural network being less than a predetermined threshold value.

22. The method of claim 19, wherein the adding comprises:
connecting the new node to nodes included in a layer preceding the hidden layer including the determined node; and
connecting the new node to nodes included in layer subsequent to the hidden layer including the determined node.

23. The method of claim 19, wherein the configuring further comprises:
selecting the selected portion of the connection weights of the determined node.

24. The method of claim 19, further comprising:
training the neural network comprising the extended hidden layer.

* * * * *